(12) United States Patent
Chern et al.

(10) Patent No.: US 10,209,348 B2
(45) Date of Patent: Feb. 19, 2019

(54) OPTICAL APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 227 days.

(21) Appl. No.: 15/217,182

(22) Filed: Jul. 22, 2016

(65) Prior Publication Data

US 2017/0023666 A1 Jan. 26, 2017

(30) Foreign Application Priority Data

Jul. 24, 2015 (TW) .............................. 104124094 A

(51) Int. Cl.
*G01C 3/08* (2006.01)
*G01S 7/481* (2006.01)
*G01S 17/08* (2006.01)

(52) U.S. Cl.
CPC .......... *G01S 7/4816* (2013.01); *G01S 7/4815* (2013.01); *G01S 17/08* (2013.01); *G01S 7/4813* (2013.01)

(58) Field of Classification Search
CPC .... G01S 7/4815; G01S 7/4816; G01S 7/4813; G01S 17/08

USPC ......................................................... 356/5.01
See application file for complete search history.

(56) References Cited

U.S. PATENT DOCUMENTS

| 4,115,701 | A | * | 9/1978 | Guichard | ................ | G01S 17/08 |
| | | | | | | 250/216 |
| 5,760,885 | A | * | 6/1998 | Yokoyama | ............ | G01S 7/4814 |
| | | | | | | 356/4.01 |
| 7,199,454 | B2 | * | 4/2007 | Arndt | ................ | H01L 31/02005 |
| | | | | | | 257/675 |
| 7,544,945 | B2 | * | 6/2009 | Tan | ........................ | G01S 7/4811 |
| | | | | | | 180/169 |
| 9,671,490 | B2 | * | 6/2017 | Brandl | .................. | H01L 25/167 |

FOREIGN PATENT DOCUMENTS

TW     I477759 (B)     3/2015

* cited by examiner

*Primary Examiner* — Mark Hellner
(74) *Attorney, Agent, or Firm* — Muncy, Geissler, Olds & Lowe, P.C.

(57) ABSTRACT

An optical apparatus includes a photosensitive diode unit, a lens and a microstructure unit. The microstructure unit is arranged between the photosensitive diode unit and the lens. After plural light beams passing through the lens are received by the microstructure unit, travelling directions of the plural light beams are changed. Consequently, at least a portion of the plural light beams is guided to the photosensitive diode unit. In such way, the light collecting efficacy of the photosensitive diode unit is enhanced.

18 Claims, 5 Drawing Sheets

OPTICAL APPARATUS

FIELD OF THE INVENTION

The present invention relates to an optical apparatus, and more particularly to an optical apparatus with a microstructure unit.

BACKGROUND OF THE INVENTION

Recently, with the development of electronic industries and the advance of materials technologies, various electronic devices are designed toward small size, light weightiness and easy portability. Consequently, these electronic devices can be applied to mobile business, entertainment or leisure purposes whenever or wherever the users are. For example, various optical apparatuses are widely used in many kinds of fields such as smart phones, wearable electronic devices or any other appropriate portable electronic devices. Since the electronic devices are small and portable, the users can take the electronic devices to capture images and store the images according to the users' requirements. Alternatively, the images can be uploaded to the internet through mobile networks. In other words, these electronic devices not only have important commercial values but also provide more colorful lives to people.

With the improvement of the living quality, people's demands on more functions of the optical apparatuses of the portable electronic device are extensively increased. Consequently, the portable electronic device brings more convenient functions. For example, the optical apparatus can emit and receive a laser beam to measure a distance of an object from the optical apparatus. Generally, the distance can be quickly measured by a TOF (Time of Flight) measurement method. Regardless of whether the optical apparatus is used to capture 2D or 3D images, perform distance measurement or sense an object, the light collecting efficacy (or the light collection efficiency) of the optical apparatus is one of the important factors influencing the overall quality as well as the processing speed. However, the conventional optical apparatus for increasing the light collecting efficacy cannot be produced in a simple fabricating process and the fabricating cost of the optical apparatus is generally high.

Moreover, the application of the optical apparatus is not restricted to the portable electronic device. For example, Taiwanese Patent No. I477759 discloses an optical detecting apparatus for detecting the physiological parameters of the biological tissue. By a microstructure unit, the energy of a light beam from a light-emitting element is concentrated into a diffractive light in a specified diffractive order. The diffractive light in the specified diffractive order is introduced into a biological tissue that is in contact with the optical detecting apparatus. Then, the light beam scattered and reflected from the biological tissue is guided by a waveguide and transmitted to an optical detecting unit. Consequently, the intensity of the light beam received by the optical detecting unit is increased. However, this optical detecting apparatus is only suitable for the contact-type measurement. Moreover, the microstructure unit is only used to concentrate the energy of the received light beam into the diffractive light in the specified diffractive order. The microstructure unit does not have the function of guiding the light beam.

In other words, the optical apparatus needs to be further improved.

SUMMARY OF THE INVENTION

For solving the drawbacks of the conventional technologies, the present invention provides an optical apparatus for increasing the light collecting efficacy (or the light collection efficiency) of a photosensitive diode unit.

In accordance with an aspect of the present invention, there is provided an optical apparatus. The optical apparatus includes a photosensitive diode unit, a lens and a light source. A microstructure unit which is essentially corresponding, but not limited, to the photosensitive diode unit is formed on the lens. The light source provides plural first light beams. After the plural first light beams pass through the lens, the plural first light beams are transmitted to an object and reflected by the object. After the plural first light beams reflected by the object pass through the lens, the plural first light beams are received by the microstructure unit and travelling directions of the plural first light beams are changed. Consequently, at least a portion of the plural first light beams is guided to the photosensitive diode unit.

In an embodiment, the lens has a first surface and a second surface, and the first surface and the second surface are opposed to each other. The photosensitive diode unit and the light source are arranged beside the first surface of the lens, and the object is arranged beside the second surface of the lens.

In an embodiment, at least one of the first surface and the second surface is a flat surface, or at least one of the first surface and the second surface is a curvy surface, as a form of aspheric surface.

In an embodiment, the microstructure unit is formed on at least one position of the first surface of the lens. After the plural first light beams from the light source pass through the first surface and the second surface of the lens sequentially, the plural first light beams are transmitted to the object and reflected by the object. After the plural first light beams reflected by the object pass through the second surface of the lens, the plural first light beams are received by the microstructure unit. Consequently, at least a portion of the plural first light beams is guided to the photosensitive diode unit.

In an embodiment, the light source further provides plural second light beams, and the plural second light beams are directly transmitted to the photosensitive diode unit without passing through the lens. A distance of the object from the optical apparatus is acquired according to a time difference between a time point of receiving the plural first light beams by the photosensitive diode unit and a time point of receiving the plural second light beams by the photosensitive diode unit.

In an embodiment, the light source includes a laser diode, a light emitting diode, an organic light emitting diode and/or a light-emitting unit that emits light beams in a thermal band.

In an embodiment, the optical apparatus is a portable electronic device.

In an embodiment, the lens is combined with a casing of the portable electronic device.

In an embodiment, at least a portion of the plural first light beams has a wavelength in a specified wavelength range.

In an embodiment, the microstructure unit includes a diffractive optical element, a thin film with a Fresnel surface, or a diffractive optical element with a Fresnel surface.

In an embodiment, the optical apparatus is not in contact with the object.

In accordance with an aspect of the present invention, there is provided an optical apparatus. The optical apparatus includes a photosensitive diode unit, a lens and a microstructure unit. The microstructure unit is arranged between the photosensitive diode unit and the lens. After plural first light beams passing through the lens are received by the microstructure unit, travelling directions of the plural first light beams are changed, so that at least a portion of the plural first light beams is guided to the photosensitive diode unit.

In an embodiment, the microstructure unit is formed on the lens, or the microstructure unit is formed on the photosensitive diode unit.

In an embodiment, the lens is combined with a casing of an electronic device.

In an embodiment, the optical apparatus further comprises the electronic device and/or the casing.

In an embodiment, at least a portion of the plural first light beams has a wavelength in a specified wavelength range.

In an embodiment, the microstructure unit includes a diffractive optical element, a thin film with a Fresnel surface, or a diffractive optical element with a Fresnel surface.

In an embodiment, the optical apparatus further comprises an additional photosensitive diode unit and an additional microstructure unit. After plural second light beams passing through the lens are received by the additional microstructure unit, travelling directions of the plural second light beams are changed. Consequently, at least a portion of the plural second light beams is guided to the additional photosensitive diode unit.

In an embodiment, the optical apparatus further includes at least one light source, and the light source provides the plural first light beams and/or plural second light beams.

In an embodiment, the light source includes a laser diode, a light emitting diode, an organic light emitting diode and/or a light-emitting unit that emits light beams in a thermal band.

From the above descriptions, the present invention provides an optical apparatus. The optical apparatus comprises a lens and a photosensitive diode unit. A microstructure unit with a designed microstructure pattern is arranged between the lens and the photosensitive diode unit. After a light beam passes through the lens, the light beam is guided by the microstructure unit and transmitted to the photosensitive diode unit. Consequently, the light collecting efficacy (or the light collection efficiency) of the photosensitive diode unit is enhanced. Since the fabricating process of the optical apparatus of the present invention is simplified and the fabricating cost is reduced, the optical apparatus of the present invention is industrially applicable.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
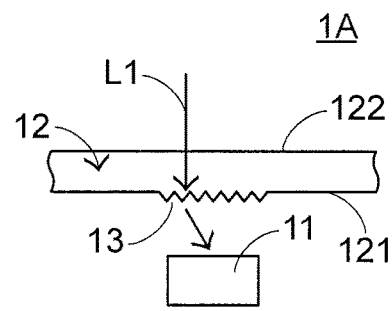
FIG. 1 schematically illustrates an optical apparatus according to a first embodiment of the present invention.

FIG. 1 schematically illustrates an optical apparatus according to a first embodiment of the present invention. As shown in FIG. 1, the optical apparatus 1A comprises a photosensitive diode unit 11, a lens 12 and a microstructure unit 13. The microstructure unit 13 is arranged between the photosensitive diode unit 11 and the lens 12. In this embodiment, the lens 12 has a first surface 121 and a second surface 122. The first surface 121 and the second surface 122 are opposed to each other. According to the practical requirements, the microstructure unit 13 is formed on a portion or the entire of the first surface 121 of the lens 12. The photosensitive diode unit 11 is aligned with the microstructure unit 13 and located at a proper position beside the first surface 121 of the lens 12. As shown in FIG. 1, both of the first surface 121 and the second surface 122 are flat surfaces. It is noted that the first surface 121 and the second surface 122 are not restricted to the flat surfaces. In some embodiments, one of the first surface 121 and the second surface 122 is a curvy surface, such as a form of aspheric surface, according to the practical requirements.

Moreover, plural light beams L1 are introduced into the lens 12 through the second surface 122 of the lens 12 and directed to the microstructure unit 13. When the plural light beams L1 are received by the microstructure unit 13, the travelling directions of the light beams L1 are changed. Consequently, at least a portion of the light beams L1 is guided to the photosensitive diode unit 11. Under this circumstance, the light collecting efficacy (or the light collection efficiency) of the photosensitive diode unit 11 is enhanced.

The microstructure unit 13 comprises a microstructure pattern (not shown). The microstructure pattern is designed according to practical requirements. When the light beams L1 pass through the microstructure pattern, the light beams L1 are shaped by the microstructure pattern. Consequently, the light beams L1 outputted from the microstructure pattern can be flexibly adjusted. After the light beams L1 are outputted from the microstructure pattern, the light beams L1 are guided to the photosensitive diode unit 11. The ways of designing the microstructure pattern and outputting the desired light beams by the microstructure pattern are well known to those skilled in the art, and are not redundantly described herein.

In this embodiment, the microstructure unit 13 includes a diffractive optical element (DOE), a thin film with a Fresnel surface and/or plural microstructure patterns in a stack form. Preferably but not exclusively, the microstructure unit 13 is made of a wavelength-sensitive material. The microstructure unit 13 is used for filtering out the light beams in a specified wavelength range. Consequently, only the light beams in the specified wavelength range are guided to the photosensitive diode unit 11.

Figure 2:
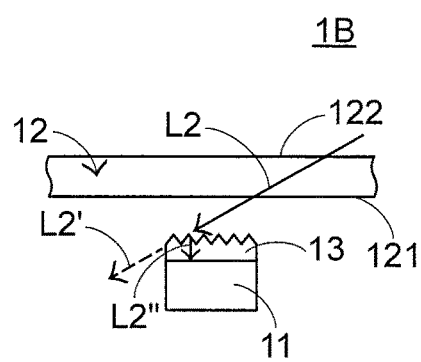
FIG. 2 schematically illustrates an optical apparatus according to a second embodiment of the present invention.

FIG. 2 schematically illustrates an optical apparatus according to a second embodiment of the present invention. The components of the optical apparatus 1B of this embodiment that are similar to those of the first embodiment are not redundantly described herein. In comparison with the first embodiment, the microstructure unit 13 is formed on the photosensitive diode unit 11. In case that the microstructure unit 13 is formed on the lens 12 (see FIG. 1), the light beam L2 is propagated along the direction of the light beam L2' indicated by the dotted arrow. Since the microstructure unit 13 is formed on the photosensitive diode unit 11, the light beam L2 is guided by the microstructure unit 13 and transmitted to the photosensitive diode unit 11 along the direction of the light beam L2" indicated by the solid arrow.

Figure 3:
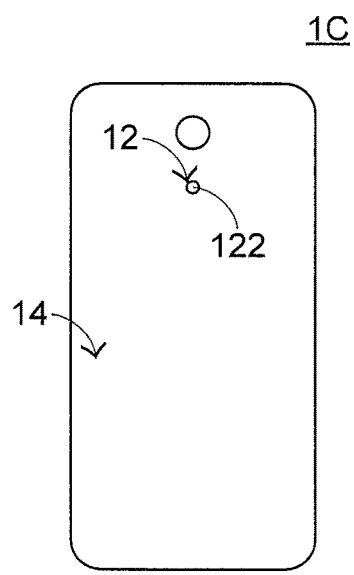
FIG. 3 schematically illustrates the outward appearance of an optical apparatus according to a third embodiment of the present invention.
Figure 4:
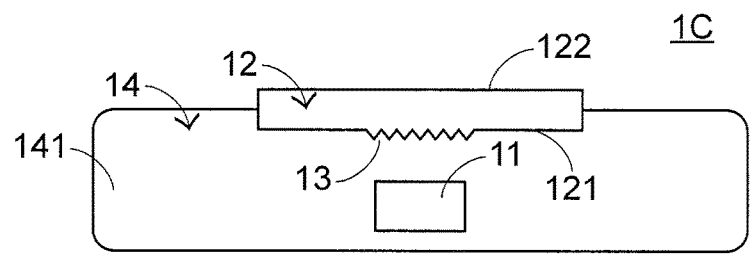
FIG. 4 schematically illustrates the partial structure of the optical apparatus of FIG. 3.

Please refer to FIGS. 3 and 4. FIG. 3 schematically illustrates the outward appearance of an optical apparatus according to a third embodiment of the present invention. FIG. 4 schematically illustrates the partial structure of the optical apparatus of FIG. 3. The components of the optical apparatus 1C of this embodiment that are similar to those of the first embodiment are not redundantly described herein. In comparison with the first embodiment, the optical apparatus 1C is a portable electronic device. An example of the portable electronic device includes but is not limited to a smart phone, a tablet computer or a wearable electronic device. The optical apparatus 1C further comprises a casing 14. The lens 12 is combined with the casing 14. The photosensitive diode unit 11 is disposed within an accommodation space 141 that is defined by the casing 14.

Figure 5:
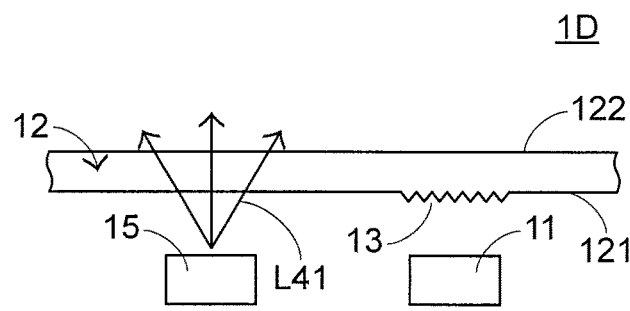
FIG. 5 schematically illustrates an optical apparatus according to a fourth embodiment of the present invention.

FIG. 5 schematically illustrates an optical apparatus according to a fourth embodiment of the present invention. The components of the optical apparatus 1D of this embodiment that are similar to those of the above embodiments are not redundantly described herein. In comparison with the above embodiments, the optical apparatus 1D further comprises a light source 15. The light source 15 is arranged beside the first surface 121 of the lens 12. The light source 15 provides plural light beams L41. After the light beams L41 pass through the first surface 121 and the second surface 122 of the lens 12 sequentially, the light beams L41 are outputted to provide desired light beams according to the practical requirements.

In an embodiment, the light source 15 comprises a laser diode (LD), a light emitting diode (LED), an organic light emitting diode (OLED), and/or or any other comparable semiconductor-category light-emitting element similar to the laser diode, the light emitting diode or the organic light emitting diode. Preferably but not exclusively, the light beams L41 include the light beams in a first wavelength range (e.g., visible light beams) and/or the light beams in a second wavelength range (e.g., invisible light beams or light beams in a thermal band).

Figure 6:
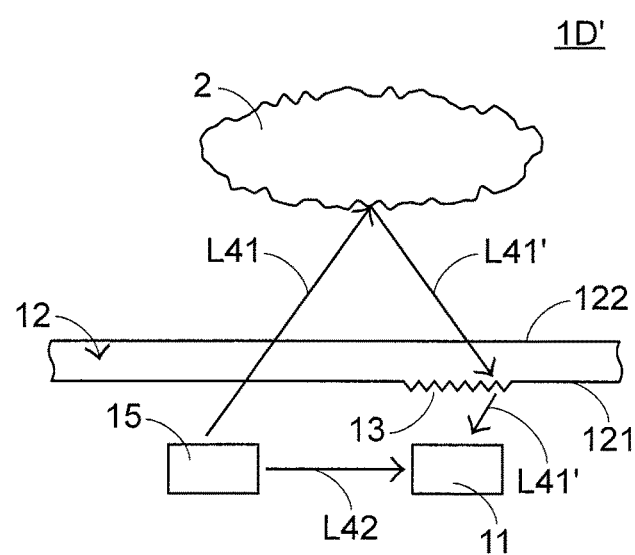
FIG. 6 schematically illustrates an application example of the optical apparatus of FIG. 5.

FIG. 6 schematically illustrates an application example of the optical apparatus of FIG. 5. In this application example, the optical apparatus 1D' is used for measuring a distance of an object 2. The object 2 is arranged beside the second surface 122 of the lens 12. Moreover, the object 2 is not in contact with the optical apparatus 1D'. Especially, the light source 15 provides plural first light beams L41 and plural second light beams L42. After the first light beams L41 pass through the first surface 121 and the second surface 122 of the lens 12 sequentially, the first light beams L41 are transmitted to the object 2. The plural second light beams L42 do not pass through the lens 12. That is, the plural second light beams L42 are directly transmitted to the photosensitive diode unit 11. When the first light beams L41 are received by the object 2, the first light beams L41 are reflected by the object 2. The reflected first light beams L41' are transmitted through the second surface 122 of the lens 12 and transmitted to the microstructure unit 13. The reflected first light beams L41' are guided by the microstructure unit 13 and transmitted to the photosensitive diode unit 11. According to the time difference between the time point of receiving the plural first light beams L41' by the photosensitive diode unit 11 and the time point of receiving the plural second light beams L42 by the photosensitive diode unit 11, the distance of the object 2 from the optical apparatus 1D' is acquired by the optical apparatus 1D'.

Figure 7:
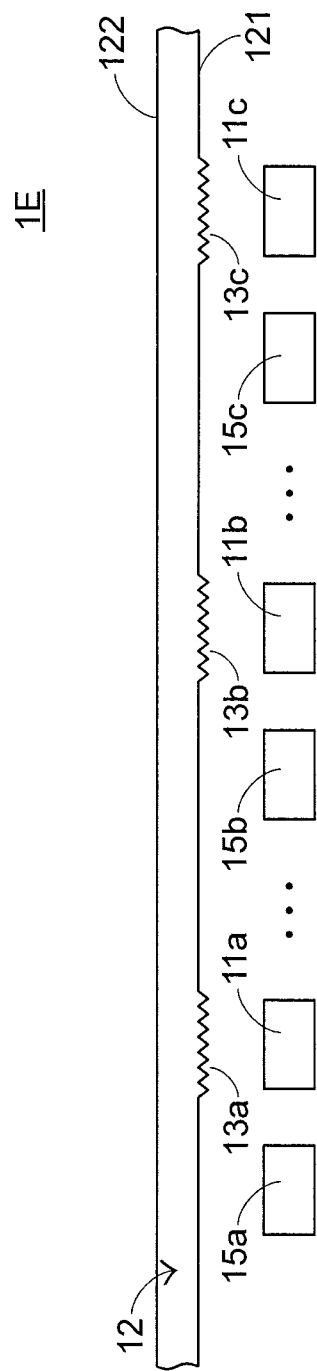
FIG. 7 schematically illustrates a portion of an optical apparatus according to a fifth embodiment of the present invention.
Figure 8:
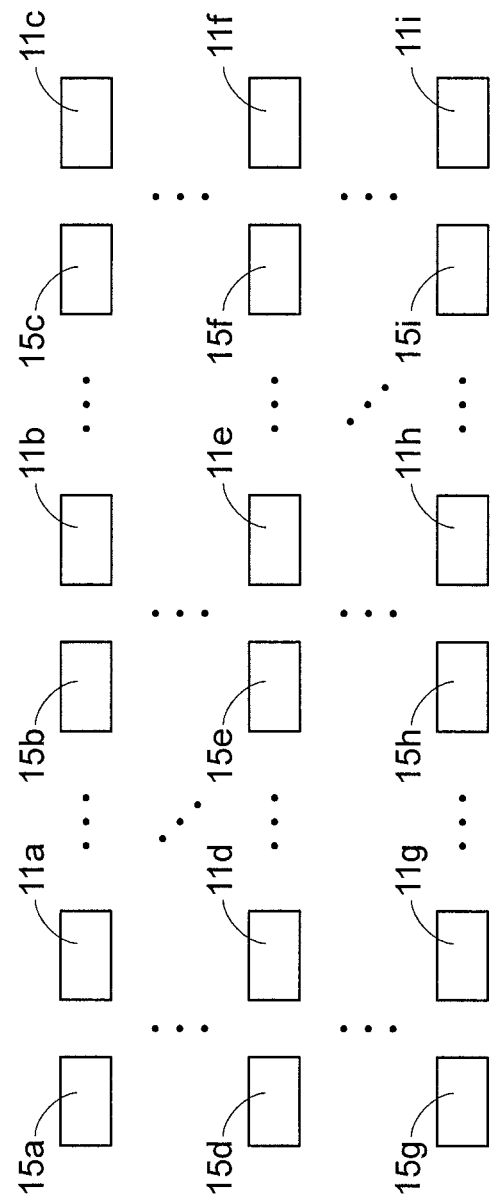
FIG. 8 schematically illustrates the arrangement of plural light sources and plural photosensitive diode units of the optical apparatus of FIG. 7.

Please refer to FIGS. 7 and 8. FIG. 7 schematically illustrates a portion of an optical apparatus according to a fifth embodiment of the present invention. FIG. 8 schematically illustrates the arrangement of plural light sources and plural photosensitive diode units of the optical apparatus of FIG. 7. The components of the optical apparatus 1E of this embodiment that are similar to those of the above embodiments are not redundantly described herein. In comparison with the above embodiments, the optical apparatus 1E comprises plural light sources $15a$~$15i$ and plural photosensitive diode units $11a$~$11i$ corresponding to the plural light sources $15a$~$15i$. Moreover, plural microstructure units $13a$~$13i$ corresponding to the plural photosensitive diode units $11a$~$11i$ are formed on the first surface 121 of the lens 12. For succinctness, only the microstructure units $13a$~$13c$ are shown in FIG. 7. The plural light sources $15a$~$15i$ and the corresponding photosensitive diode units $11a$~$11i$ are arranged side by side. Moreover, the plural light sources $15a$~$15i$ and the photosensitive diode units $11a$~$11i$ are arranged in an array. Especially, the photosensitive diode units $11a$~$11i$ have the corresponding light collecting angles and corresponding response curves. That is, these photosensitive diode units $11a$~$11i$ have different responses to the light beams in different wavelength ranges.

The above example is presented herein for purpose of illustration and description only. It is noted that numerous modifications and alterations may be made while retaining the teachings of the invention. For example, the number of the light sources, the number of the photosensitive diode units and the number of the microstructure units may be identical or different. Moreover, the arrangement of the plural light sources and the photosensitive diode units are not restricted to the array arrangement.

Figure 9:
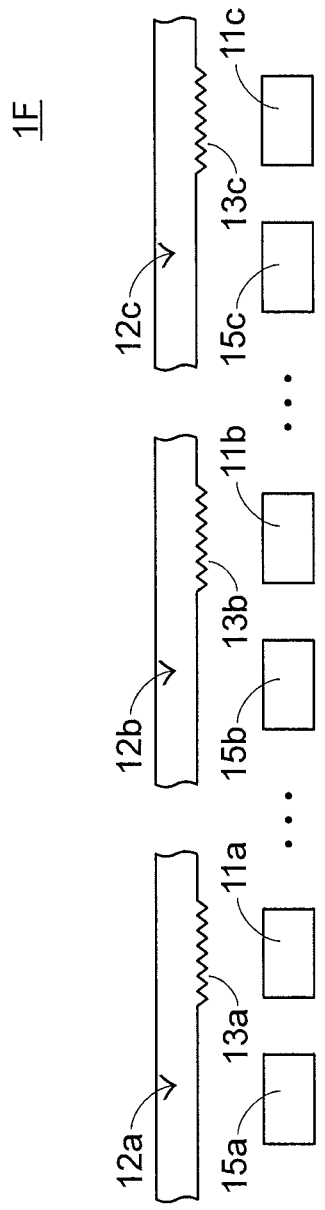
FIG. 9 schematically illustrates a portion of an optical apparatus according to a sixth embodiment of the present invention.

FIG. 9 schematically illustrates a portion of an optical apparatus according to a sixth embodiment of the present invention. The components of the optical apparatus 1F of this embodiment that are similar to those of the fifth embodiments are not redundantly described herein. In optical apparatus 1E of the fifth embodiments, one lens 12 is shared by the light sources $15a$~$15c$ and the photosensitive diode units $11a$~$11c$. The optical apparatus 1F of this embodiment comprises plural lenses $12a$~$12c$. The lens $12a$ is shared by the light source $15a$ and the photosensitive diode unit $11a$. The lens $12b$ is shared by the light source $15b$ and the photosensitive diode unit $11b$. The lens $12c$ is shared by the light source $15c$ and the photosensitive diode unit $11c$.

From the above descriptions, the present invention provides an optical apparatus. The optical apparatus comprises a lens and a photosensitive diode unit. A microstructure unit with a designed microstructure pattern is arranged between the lens and the photosensitive diode unit. After a light beam passes through the lens, the light beam is guided by the microstructure unit and transmitted to the photosensitive diode unit. Consequently, the light collecting efficacy (or the light collection efficiency) of the photosensitive diode unit is enhanced. Since the fabricating process of the optical apparatus of the present invention is simplified and the fabricating cost is reduced, the optical apparatus of the present invention is industrially applicable.

It is surely reasonable that a highly reliable apparatus in collection efficiency has to consider the features of the light source and the corresponding emission characteristics with/without lens modification. Although a term of "photosensitive" is used in this article, it is referred to light-sensitive while thermal-sensitive is also included.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical apparatus, comprising:
a photosensitive diode unit;
a lens, wherein a microstructure unit corresponding to the photosensitive diode unit is formed on the lens; and
a light source providing plural first light beams and plural second light beams, wherein after the plural first light beams pass through the lens, the plural first light beams are transmitted to an object and reflected by the object, wherein the plural second light beams are directly transmitted to the photosensitive diode unit without passing through the lens,
wherein after the plural first light beams reflected by the object pass through the lens, the plural first light beams are received by the microstructure unit and travelling directions of the plural first light beams are changed, so that at least a portion of the plural first light beams is guided to the photosensitive diode unit, and
wherein a distance of the object from the optical apparatus is acquired according to a time difference between a time point of receiving the plural first light beams by the photosensitive diode unit and a time point of receiving the plural second light beams by the photosensitive diode unit.

2. The optical apparatus according to claim 1, wherein the lens has a first surface and a second surface, and the first surface and the second surface are opposed to each other, wherein the photosensitive diode unit and the light source are arranged beside the first surface of the lens, and the object is arranged beside the second surface of the lens.

3. The optical apparatus according to claim 1, wherein at least one of the first surface and the second surface is a flat surface, or at least one of the first surface and the second surface is a curvy surface.

4. The optical apparatus according to claim 2, wherein the microstructure unit is formed on at least one position of the first surface of the lens, wherein after the plural first light beams from the light source pass through the first surface and the second surface of the lens sequentially, the plural first light beams are transmitted to the object and reflected by the object, wherein after the plural first light beams reflected by the object pass through the second surface of the lens, the plural first light beams are received by the microstructure unit, so that at least a portion of the plural first light beams is guided to the photosensitive diode unit.

5. The optical apparatus according to claim 1, wherein the light source includes a laser diode, a light emitting diode, an organic light emitting diode and/or a light-emitting unit that emits light beams in a thermal band.

6. The optical apparatus according to claim 1, wherein the optical apparatus is a portable electronic device.

7. The optical apparatus according to claim 6, wherein the lens is combined with a casing of the portable electronic device.

8. The optical apparatus according to claim 1, wherein at least a portion of the plural first light beams has a wavelength in a specified wavelength range.

9. The optical apparatus according to claim 1, wherein the microstructure unit includes a diffractive optical element, a thin film with a Fresnel surface, or a diffractive optical element with a Fresnel surface.

10. The optical apparatus according to claim 1, wherein the optical apparatus is not in contact with the object.

11. An optical apparatus, comprising:
a photosensitive diode unit;
a lens; and
a microstructure unit formed on the photosensitive diode unit and arranged between the photosensitive diode unit and the lens,
wherein after plural first light beams passing through the lens are received by the microstructure unit, travelling directions of the plural first light beams are changed, so that at least a portion of the plural first light beams is guided to the photosensitive diode unit.

12. The optical apparatus according to claim 11, wherein the lens is combined with a casing of an electronic device.

13. The optical apparatus according to claim 12, wherein the optical apparatus further comprises the electronic device and/or the casing.

14. The optical apparatus according to claim 11, wherein at least a portion of the plural first light beams has a wavelength in a specified wavelength range.

15. The optical apparatus according to claim 11, wherein the microstructure unit includes a diffractive optical element, a thin film with a Fresnel surface, or a diffractive optical element with a Fresnel surface.

16. The optical apparatus according to claim 11, wherein the optical apparatus further comprises an additional photosensitive diode unit and an additional microstructure unit, wherein after plural second light beams passing through the lens are received by the additional microstructure unit, travelling directions of the plural second light beams are changed, so that at least a portion of the plural second light beams is guided to the additional photosensitive diode unit.

17. The optical apparatus according to claim 11, wherein the optical apparatus further comprises at least one light source, and the light source provides the plural first light beams and/or plural second light beams.

18. The optical apparatus according to claim 17, wherein the light source includes a laser diode, a light emitting diode, an organic light emitting diode and/or a light-emitting unit that emits light beams in a thermal band.

* * * * *